United States Patent [19]

Montgomery et al.

[11] 4,061,384
[45] Dec. 6, 1977

[54] BUMPER HAVING PIVOTAL LOAD SPREADER PLATE FOR DEFLECTING ENERGY ABSORBING MEDIUM

[75] Inventors: James R. Montgomery, Pendleton; John S. Saczawa, Jr., Anderson, both of Ind.

[73] Assignee: General Motors Corporation, Detroit, Mich.

[21] Appl. No.: 681,534

[22] Filed: Apr. 29, 1976

[51] Int. Cl.² ................................. B60R 19/08
[52] U.S. Cl. ................................. 293/71 R; 293/84
[58] Field of Search ................................. 293/84–85, 293/71 R, 71 P, 75, 88–89, 98, 62–63, 96, DIG. 1, DIG. 5; 267/139–141; 213/221; 114/219

[56] References Cited

U.S. PATENT DOCUMENTS

| | | | |
|---|---|---|---|
| 1,668,096 | 5/1928 | Weiland | 293/88 |
| 2,026,113 | 12/1935 | Williams | 293/89 X |
| 2,986,827 | 6/1961 | Peterson | 293/DIG. 1 |
| 3,570,257 | 3/1971 | Walker et al. | 114/219 X |
| 3,739,882 | 6/1973 | Schwenk et al. | 293/71 R X |
| 3,798,916 | 3/1974 | Schwemmer | 114/219 X |

FOREIGN PATENT DOCUMENTS

| | | | |
|---|---|---|---|
| 339,623 | 12/1930 | United Kingdom | 293/85 |
| 354,637 | 12/1931 | United Kingdom | 293/85 |

*Primary Examiner*—Allen N. Knowles
*Assistant Examiner*—Charles A. Marmor
*Attorney, Agent, or Firm*—Charles R. White

[57] ABSTRACT

Bumper assembly having resilient energy absorbing media supported on a substantially rigid beam and adapted to absorb impact energy in response to deflection by impact load. A load spreader plate outwardly of the media is supported for pivotal movement about one end thereof for transferring impact forces and increasing deflection of the media thereby improving its performance in absorbing impact energy.

3 Claims, 4 Drawing Figures

U.S. Patent  Dec. 6, 1977  4,061,384
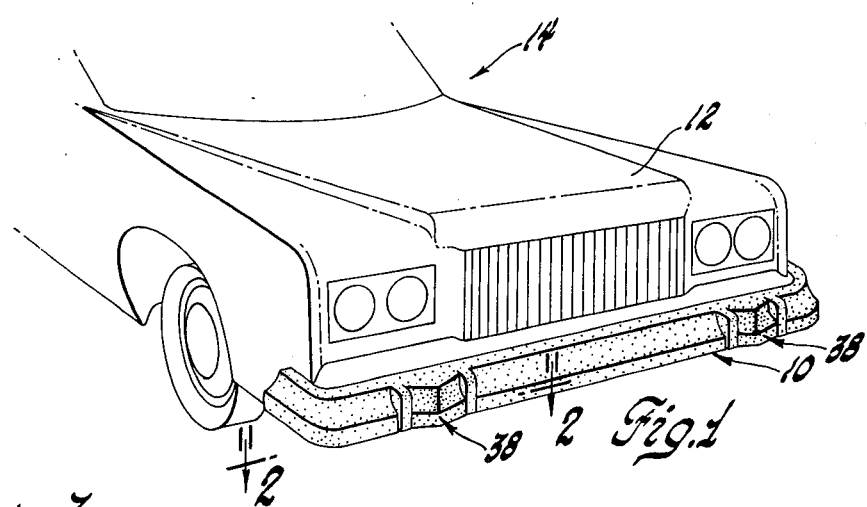
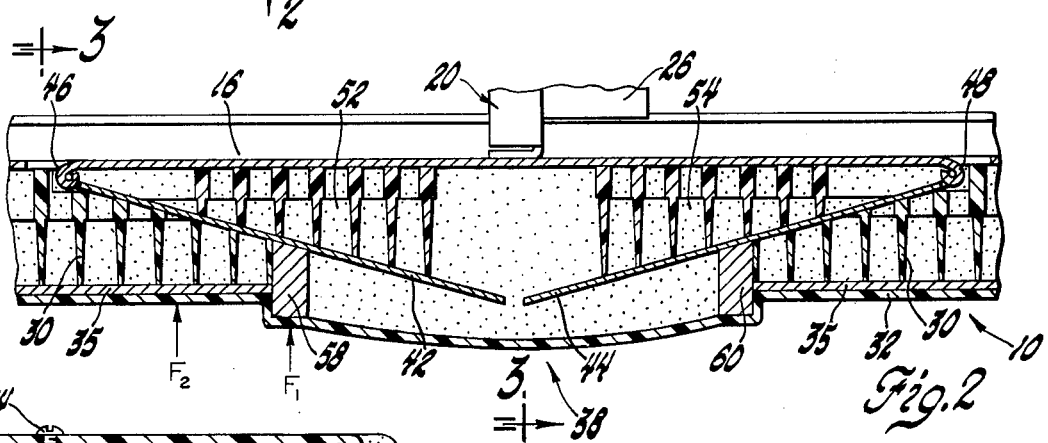
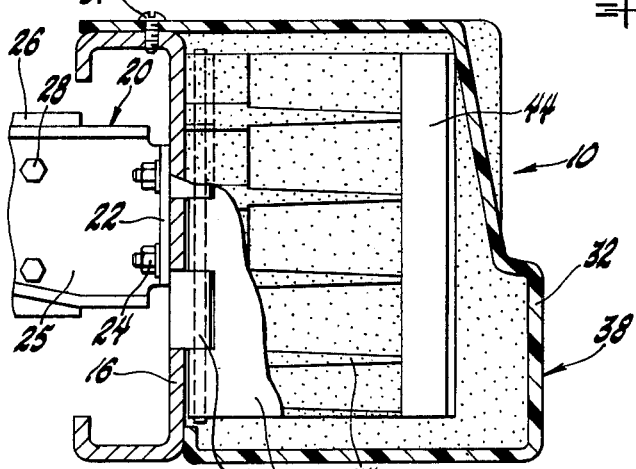
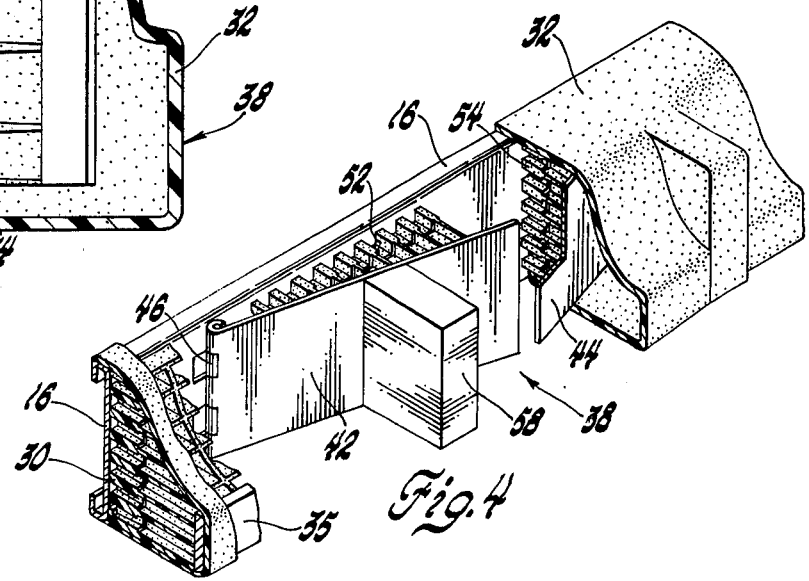

BUMPER HAVING PIVOTAL LOAD SPREADER PLATE FOR DEFLECTING ENERGY ABSORBING MEDIUM

This invention relates to energy absorbing devices and more particularly to a new and improved energy absorbing bumper having a pivotal load spreader plate for transferring impact load and increasing deflection of yieldable energy absorbing media under the plate for increasing its energy absorbing capability.

Prior to the present invention, soft face energy absorbing bumpers for vehicles have often comprised a resilient energy absorbing media supported on a substantially rigid bumper beam or other support and having a flexible plastic facia covering the media to provide a finished appearance. On impact the media generally deflects in the region of the impact to dissipate impact loads. Among the media now being employed for energy absorbing purposes are open-celled devices having cells that are generally parallel to each other and to the longitudinal axis of the vehicle. Load spreader plates are often imposed in front of such energy absorbing media and between the media and the covering facia to distribute impact loads to a larger number of cells than would be otherwise affected to improve the effectiveness of the media. While these load spreaders have provided important energy absorbing benefits they are not capable of increasing cell deflection of any of these prior art devices to thereby improve their efficiency.

Accordingly it is a feature, object and advantage of this invention to provide a new and improved bumper assembly for a vehicle comprising a yieldable energy absorbing media adapted to be supported on a rigid support surface and having a pivotally mounted load spreader plate which has the capability of transferring an impact load to the media and which has a fixed axis of rotation so that the load spreader can increase deflection of the media and improve its energy absorbing performance.

Another feature, object and advantage of this invention is to provide a new and improved energy absorbing bumper assembly incorporating a pivotally mounted load spreader for receiving an impact load and multiplying the deflection of the energy absorbing media over the distance of the applied force to thereby improve its operation in absorbing impact energy.

Another feature, object and advantage of this invention is to provide a new and improved load spreader for a resilient energy absorbing media that has the capability of transferring the force to the media and increasing the deflection thereof so that energy absorption efficiency of the media is improved.

Another feature, object and advantage of this invention is to provide a new and improved energy absorbing bumper assembly incorporating a pivotal load spreader mounted to act as a lever to multiply deflection of energy absorbing media to improve the energy absorbing characteristics of the bumper assembly.

In the preferred embodiment of this invention a yieldable energy absorbing media comprising a resilient device such as a multicelled unit is mounted on a relatively rigid backing beam or other rigid or semi-rigid support. The cells of the media are generally parallel to each other and extend generally in the direction of vehicle travel although some cellular components may face in other directions for receiving impact loads directed toward the corners or the sides of the vehicle. The amount of energy absorption is to a large measure dependent on the number and extent of cellular deflections. To provide for increased energy absorption a load spreader plate is pivotally supported at one end thereof to multiply deflection of the cells of the energy absorbing media so that there is more deflection than would be apparent from the displacement of the bumper guard or other impact receiving device attached to the load spreader plate. The axis of rotation of the load spreader plate is maintained so that the system remains stable in the event that the load is applied off center of the load spreader plate.

These and other features, objects and advantages of this invention will be more apparent from the following detailed description and drawing in which:

FIG. 1 is a perspective view of the front portion of a vehicle incorporating this invention.

FIG. 2 is a sectional view taken generally along lines 2—2 of FIG. 1.

FIG. 3 is a view taken generally along line 3—3 of FIG. 2; and

FIG. 4 is a perspective view of a portion of the bumper assembly of FIG. 1 with parts being broken away to better illustrate the invention.

Turning now in greater detail to the drawing, there is shown in FIG. 1 an energy absorbing bumper assembly 10 that extends horizontally across the front of the body 12 of a vehicle 14. Bumper assembly 10 comprises an elongated steel bumper beam 16 disposed externally of the vehicle body 12 which is rigidly connected to the vehicle by suitable mounting brackets 20 of which only one is shown. Each mounting bracket is generally L-shaped in formation and has a flange 22 that fits against the rear side of the bumper beam 16 and is secured thereto by bolt and nut fasteners 24. The leg 25 of each bracket extends at right angles with respect to the flange 22 and fits against an associated side rail 26 of the vehicle frame and is rigidly fastened thereto by threaded fasteners 28. Flexible energy absorbing media 30 forming part of the bumper assembly is secured to the outer face of the bumper beam 16 by any suitable means such as by threaded fasteners (not shown). This energy absorbing media is covered by a thin walled and flexible plastic facia 32 preferably contoured to fit the outer face of the energy absorber. The facia may be color matched with the vehicle body work or suitably coated to simulate a conventional bright work bumper. This plastic facia protects the energy absorbing media from foreign matter such as dirt and water and provides a finished appearance for the vehicle. The facia may be secured to the bumper beam by any suitable fastener means such as by threaded fasteners 34. A substantially rigid spreader plate 35 may be disposed between the outer end of the energy absorbing media 30 and the inner wall of the facia to distribute the force of localized impact loads to a large number of cells if desired.

The energy absorbing media 30 generally comprises a resilient energy absorbing matrix that may be formed in several sections from a suitable thermoplastic material such as a blended olefin. This matrix has a plurality of longitudinally extending and generally parallel cells open throughout their length which are formed by a latticework of intersecting horizontal and vertically extending walls which are generally similar to the wall construction described in copending application Ser. No. 653,348 for Energy Absorbing Cellular Matrix for Vehicles, filed Jan. 29, 1976 by G. P. Zeller et al.

In addition to the matrix 30 the bumper assembly further comprises special energy absorbers 38 to which this invention is directed. As best shown in FIGS. 2 and 4 each energy absorber 38 has a pair of flat load spreader plates 42,44 each of which has one end hinged at 46,48 respectively to the bumper beam 16. Disposed behind each of these load spreader plates is a cellular matrix 52,54 generally of the same material and construction as the matrix 30. The cellular matrices 52 and 54 are preferably wedge shaped to fill in most of the space behind the spreader plate as shown best in FIGS. 2 and 4. Each spreader plate is of a strong rigid material such as steel and has a bumper guard 58,60 of the same material respectively secured to the outer face thereof which extends to the inside wall of the facia. If desired, the interspace between the matrices 52 and 54, the bumper guards 58 and 60, the facia and the bumper beam may contain a foam filler material.

Assuming that the bumper guard 58 or 60 is impacted and displaced inwardly by force $F_1$, the impact force will be transmitted to the associated load spreader plate 42 or 44 and if sufficiently high the load spreader plate will swing on its pivotal axis deflecting all of the cells beneath. Since the axis of rotation of the spreader plate is fixed, the system remains stable even in instances where the load is applied offcenter of the bumper guard or the load spreader plate. The fixed axis of rotation allows the load spreader to multiply the deflection of a large portion of the matrix over the distance of the applied force. For example, if the bumper guard is displaced one-half inch the portion of the lever arm outboard of the bumper guard would multiply that displacement as it swings through a large arc to cause increased buckling and deflection of the cells outboard of the bumper guard. With this multiplied displacement, the efficiency and action of the energy absorbing matrix in handling the applied force is improved so that damage to the vehicle is sharply reduced for most low speed impacts. As shown in FIG. 2 the energy absorbing matrix 30 can be cut to fit directly over the load spreader plate so that all areas are filled in. This construction is also important in certain localized impact situations. For example, the bumper assembly 10 may be impacted by force $F_2$ outboard of bumper guard 58. If sufficiently high, this force will be at least partially transmitted by spreader plate 35 and certain cells of matrix 30 to the pivoted load spreader plate 42. In consequence of this, the load spreader plate 42 may pivot on its axis to cause the cells of matrix 42 to buckle and absorb impact energy. As in the case of the impact of bumper guard 58, the amount of cell deflection of matrix 52 will be increased, and as apparent from FIG. 2 the number of cells being deflected will be increased as compared to that of a one-piece matrix directly behind spreader plate 35. Thus the deflection of cells of matrix 52 inboard of the bumper guard provides additional energy absorption to prevent damage to the vehicle. After removal of the impact loads $F_1$ or $F_2$ the cells of the energy absorbing matrix will gradually return toward their original shape so that there is no apparent damage to the bumper assembly.

Although the energy absorbing media described with this embodiment of the invention has been described as being resilient and as having open cells, other media could be substituted therefor if desired. A resilient closed cell foam may be used or a collapsible metallic or fiber honeycomb energy absorber could be readily used in place of the energy absorbing media described.

While a preferred embodiment of the invention has been shown and described to illustrate the invention it will be appreciated that other embodiments will be now apparent to those skilled in the art and that therefore the invention is to be limited only by the scope of the following claims.

We claim:

1. An energy absorbing bumper assembly for a vehicle comprising an elongated normally rigid bumper beam supported by a vehicle, deflectable energy absorbing media means mounted on said bumper beam and extending longitudinally thereof a predetermined distance less than the length of said bumper beam and projecting outwardly therefrom, said media means being a wedge shaped block having an inner planar back surface supported on said bumper beam and having an outer planar front surface extending at a predetermined angle with respect to said back surface, a flat load spreader plate aligned with said bumper beam, said plate being of a substantially rigid material disposed along and parallel to the entire front surface of said block and extending at one end beyond the same to a position closely adjacent the bumper beam, means pivotally connecting said one end of said load spreader plate directly to said rigid bumper beam for limited turning movement about a fixed axis of rotation towards said bumper beam in response to an impact load applied to the spreader plate so that the load spreader plate functions as a lever arm to simultaneously deflect the forward portion of the energy absorbing block to increase the energy absorption efficiency thereof and a flexible plastic facia attached to said bumper beam for covering said bumper beam, said load spreader plate and said energy absorbing block.

2. An energy absorbing bumper assembly for a vehicle comprising an elongated normally rigid bumper beam supported by and extending laterally across one end of the vehicle, yieldable energy absorbing media means mounted on said bumper beam extending longitudinally thereof a predetermined distance less than the length of said bumper beam and projecting therefrom in an outward direction in relation to the vehicle, said media means being a wedge shaped block of multicellular material having a planar back surface seated on said bumper beam and a planar outer front surface disposed at an angle with respect to said back surface, a flat load spreader plate of rigid material disposed outwardly of said media means parallel to the outer front surface thereof and extending from a free end to a terminal end beyond said block to a position closely adjacent the bumper beam, said block filling the majority of the space between said plate and said bumper beam, pivot means connecting said terminal end of said load spreader plate for limited pivotal movement with respect to said rigid bumper beam for movement about a fixed axis of rotation towards said bumper beam in response to an impact load applied to the spreader plate so that the load spreader plate functions as a lever arm to deflect said block to increase the energy absorption efficiency of said energy absorber means, and a flexible facia attached to said bumper beam covering said media and said load spreader plate.

3. An energy absorbing bumper assembly for a vehicle comprising an elongated normally rigid bumper beam supported by and extending laterally across one end of the vehicle, resilient energy absorbing media means mounted on said bumper beam and extending longitudinally a predetermined distance less than the length of said bumper beam and projecting outwardly therefrom in the outboard direction in relation to the vehicle, said media means being a one-piece wedge shaped block of cellular material having a plurality of outwardly extending parallel cells, said block having a planar back surface and an outer forward surface, said outer forward surface being in a plane that intersects the plane of said back surface, said back surface being supported on said bumper beam, a flat thin-walled load spreader plate of substantially rigid material seated against the entire outer front surface of said block and extending at one end beyond the same to a position closely adjacent the bumper beam, said block filling the majority of the space between said plate and said bumper beam, means pivotally connecting said one end of said load spreader plate to said rigid bumper beam for limited turning movement about a substantially vertical axis of rotation towards said bumper beam in response to an impact load applied to said spreader plate so that the load spreader plate functions as a lever arm to deflect said energy absorber means and increase the energy absorption efficiency thereof.

* * * * *